United States Patent
Jana et al.

(10) Patent No.: US 12,353,353 B2
(45) Date of Patent: Jul. 8, 2025

(54) BATCH CONSOLIDATION OF COMPUTING OBJECT SNAPSHOTS

(71) Applicant: Rubrik, Inc., Palo Alto, CA (US)

(72) Inventors: Sayantan Jana, Bangalore (IN); Vaiapuri Ramasubramaniam, Bangalore (IN); Shubham Tagra, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/378,619

(22) Filed: Oct. 10, 2023

(65) Prior Publication Data
US 2025/0117361 A1    Apr. 10, 2025

(51) Int. Cl.
*G06F 16/18* (2019.01)
*G06F 16/11* (2019.01)
*G06F 16/17* (2019.01)

(52) U.S. Cl.
CPC ........ *G06F 16/128* (2019.01); *G06F 16/1727* (2019.01); *G06F 16/1873* (2019.01)

(58) Field of Classification Search
CPC . G06F 16/128; G06F 16/1727; G06F 16/1873
See application file for complete search history.

(56) References Cited

U.S. PATENT DOCUMENTS

| | | | | |
|---|---|---|---|---|
| 2019/0129739 A1* | 5/2019 | Al Reza | ............... | G06F 11/3051 |
| 2019/0213123 A1* | 7/2019 | Agarwal | ............... | G06F 3/0608 |
| 2019/0213267 A1* | 7/2019 | Agarwal | ............... | G06F 11/1458 |
| 2021/0026671 A1* | 1/2021 | Hadas | ............... | G06F 9/45558 |

\* cited by examiner

*Primary Examiner* — Merilyn P Nguyen
(74) *Attorney, Agent, or Firm* — Holland & Hart LLP

(57) ABSTRACT

Methods, systems, and devices for data management are described. A backup cluster may store incremental or base snapshots of computing objects. When a snapshot expires, a data management system (DMS) that manages the backup cluster may in some cases merge or consolidate the expired snapshot with a non-expired snapshot to create a new merged snapshot. In some cases, however, consolidation may be deferred until a chain of multiple expired snapshots satisfies one or more heuristic thresholds, to conserve resources. Example heuristic thresholds may be a length of the chain, an amount of space reclaimable by consolidating the snapshots, an age of the expired snapshots in the chain of incremental snapshots, or an amount of free space on the backup cluster.

20 Claims, 12 Drawing Sheets

BATCH CONSOLIDATION OF COMPUTING OBJECT SNAPSHOTS

FIELD OF TECHNOLOGY

The present disclosure relates generally to data management, including techniques for batch consolidation of computing object snapshots.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
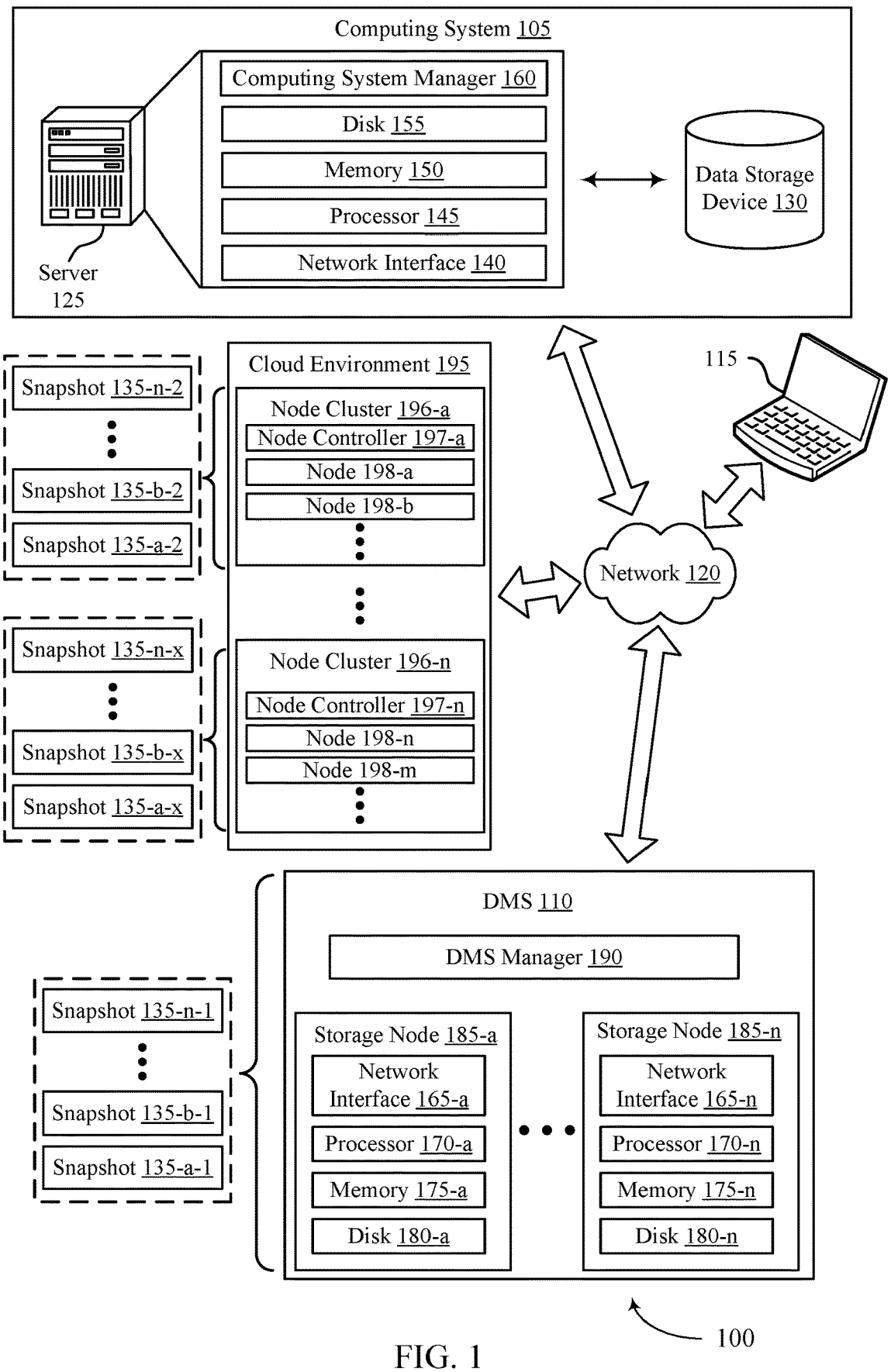
FIG. 1 illustrates an example of a computing environment that supports batch consolidation of computing object snapshots in accordance with aspects of the present disclosure.

A data management system (DMS) may store (e.g., at a cluster of storage nodes, which may be referred to as a backup cluster) base snapshots and incremental snapshots of computing objects (e.g., customer data) to support backup and restoration of the computing objects. Base snapshots (also referred to as full snapshots) may represent the entirety of the state of the corresponding computing object as of a point in time corresponding to the base snapshot. An incremental snapshot may represent the changes to the state—which may be referred to as the delta—of the corresponding computing object that have occurred between an earlier or later point in time corresponding to another snapshot (e.g., a base snapshot or another incremental snapshot). The DMS may store a snapshot for a certain amount of time according to a customer configuration (e.g., for 10 days, 1 month, or 1 year).

When a given snapshot expires (e.g., becomes eligible for deletion), the DMS may merge or consolidate the expired snapshot with a non-expired snapshot to create a new merged snapshot, after which the expired snapshot and the other snapshot subject to the merger may be deleted from the backup cluster. A consolidate job may identify, from a patch file for the expired snapshot, data that is shared with (e.g., incorporated via reference by) the non-expired snapshot (dataset Dx) and hence should not be deleted, along with data that is not shared with the non-expired snapshot (dataset Ex) and hence can be deleted. The consolidate job may write a new patch file for the non-expired snapshot that includes dataset Dx from the expired snapshot and the other data from the non-expired snapshot, after which the patch file for the expired snapshot and the old patch file for the non-expired snapshot may be deleted. Thus, consolidation frees space that would otherwise be used to store expired snapshots. Each consolidation job for each expired snapshot involves multiple read and write operations, which may involve significant disk input/output operations per second (IOPS) and central processing unit (CPU) cycles.

Aspects of this disclosure relate to deferring consolidation jobs until multiple chained incremental snapshots can be consolidated together to reduce disk IOPS and save CPU cycles. Consolidating multiple expired incremental snapshots at the same time may reduce the amount of read and write operations and CPU cycles by eliminating redundant read and write operations that may otherwise be involved in snapshot-by-snapshot consolidation. The DMS may merge the expired chain of incremental snapshots with an unexpired snapshot when the expired chain of incremental snapshots satisfies one or more heuristic thresholds. For example, the one or more heuristic thresholds may include a length of the chain (e.g., the number of expired snapshots), an amount of space reclaimable by consolidating the snapshots, an age of the expired snapshots in the chain of incremental snapshots, or an amount of free space on the backup cluster.

FIG. 1 illustrates an example of a computing environment 100 that supports batch consolidation of computing object snapshots in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

When an incremental snapshot 135 is expired (which may be referred to as snapshot Sx), data that belongs to the snapshot and that is shared with the next incremental snapshot 135 (which may be referred to as snapshot Sy) may not be deleted (referred to as data set Dx). For example, the snapshots Sy and Sx may be stored at the DMS 110 or on a node cluster 196 in a cloud environment 195. Data that belongs to the snapshot Sx that is not shared with the snapshot Sy may be deleted (referred to as data set Ex). A consolidate job that is run by the DMS 110 may identify the data set Dx and the data set Ex and may write a new patch file for the non-expired snapshot that includes dataset Dx from the expired snapshot and the other data from the non-expired snapshot, after which the patch file for the expired snapshot and the old patch file for the non-expired snapshot may be deleted. Thus, consolidation frees space that would otherwise be used to store expired snapshots. Consolidating patch files may result in patch files that are less fragmented and more sequential.

Figure 2:
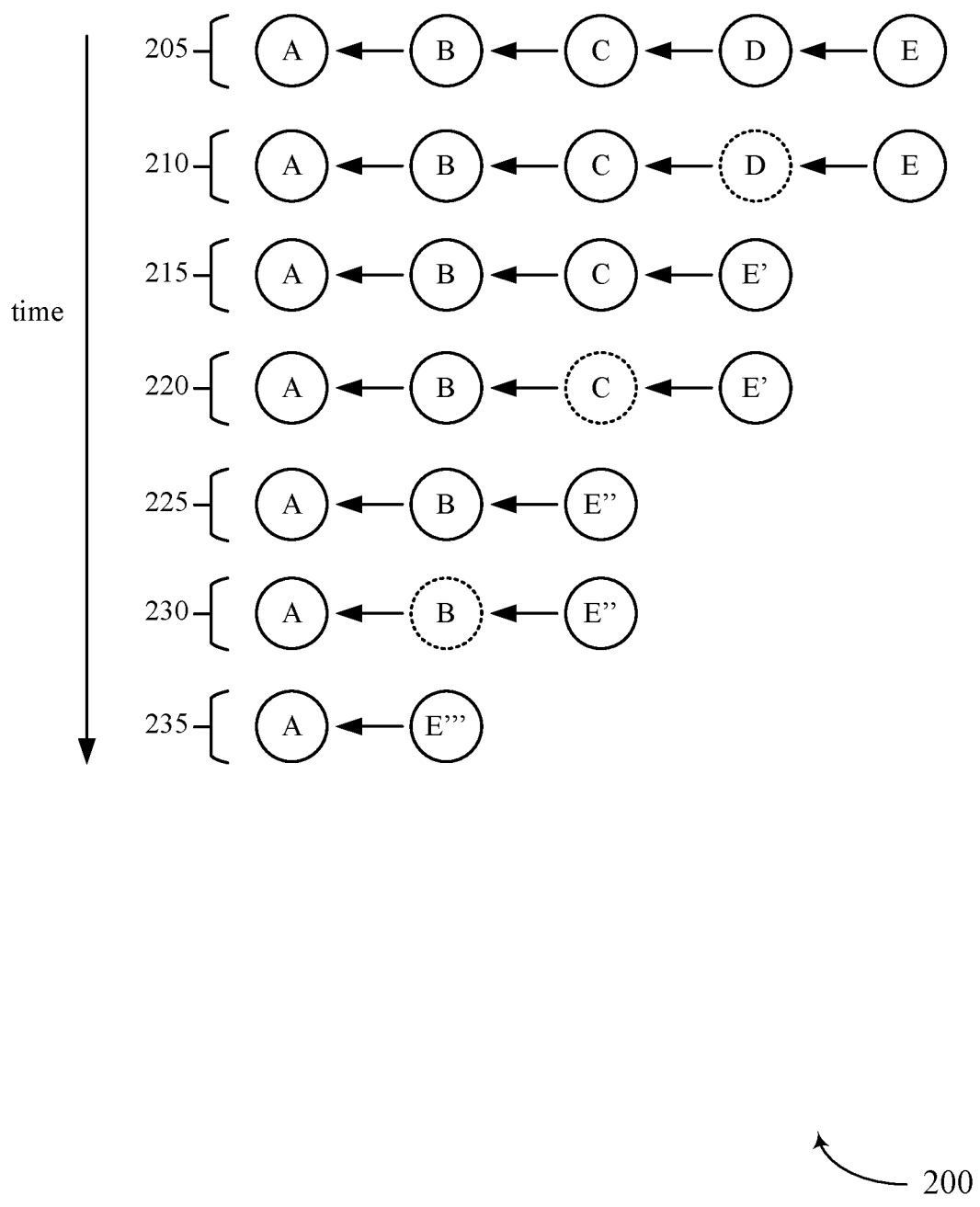
FIG. 2 shows an example of a timing diagram for a consolidation process in accordance with aspects of the present disclosure.
Figure 3:
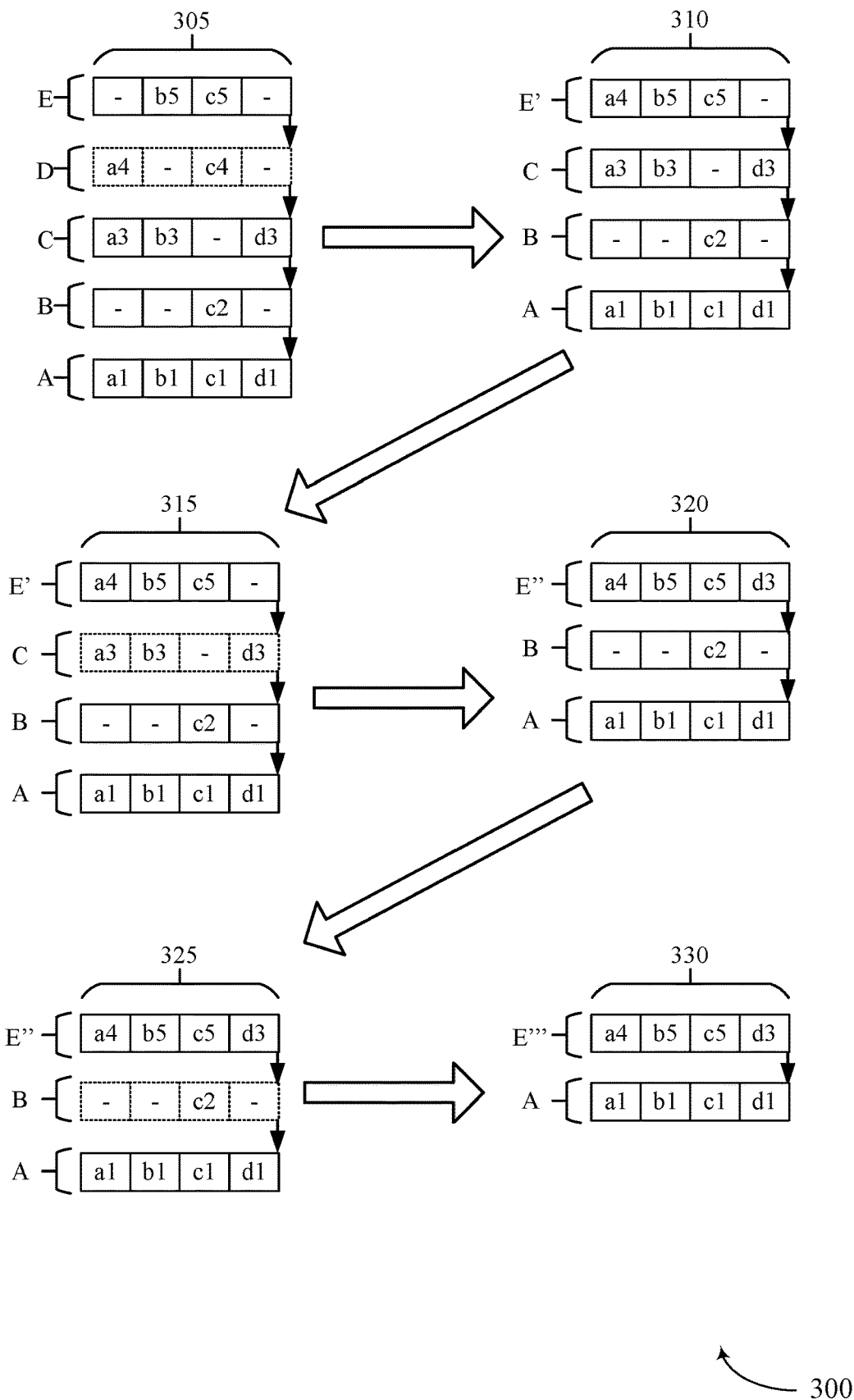
FIG. 3 shows an example of a flow diagram for a consolidation process in accordance with aspects of the present disclosure.

Each consolidation job for each expired snapshot involves multiple read and write operations, which may involve significant IOPS and CPU cycles, for example, as shown with respect to FIGS. 2 and 3. For example, contents in the snapshot chain management layer corresponding to a snapshot 135 are read and written multiple times by the consolidate job, which involves significant IOPS and CPU cycles. For example, consolidation jobs may consume up to 70% of total disk bytes utilization of a node cluster 196, and thus reducing the quantity of consolidation jobs may reduce disk and CPU utilization.

Accordingly, the DMS 110 may defer consolidate jobs until multiple chained incremental snapshots can be consolidated together to reduce disk IOPS and save CPU cycles. Consolidating multiple expired incremental snapshots at the same time may reduce the amount of read and write operations and CPU cycles by eliminating redundant read and write operations that may otherwise be involved in snapshot-by-snapshot consolidation. The DMS may merge the expired chain of incremental snapshots with an unexpired snapshot when the expired chain of incremental snapshots satisfies a heuristic threshold. For example, the heuristic threshold may be a length of the chain (e.g., the number of expired snapshots), an amount of space reclaimable by consolidating the snapshots, an age of the expired snapshots in the chain of incremental snapshots, or an amount of free space on the backup cluster.

FIG. 2 shows an example of a timing diagram 200 for a consolidation process in accordance with aspects of the present disclosure. The timing diagram 200 may implement one or more aspects of the computing environment 100. For example, the timing diagram 200 may be implemented by a DMS 110 which manages snapshots 135 of a computing object which may be stored at one or more storage nodes 185 at the DMS 110 or at one or more node clusters 196 in a cloud environment 195, as described with reference to FIG. 1.

At a first time 205, a set of snapshots of a computing object (e.g., snapshot A, snapshot B, snapshot C, snapshot D, and snapshot E) may be stored at a location accessible to a DMS 110. Snapshot A may be a base snapshot, and snapshot B, snapshot C, snapshot D, and snapshot E may be incremental snapshots.

At time 210, the DMS 110 may identify that the snapshot D has expired. At time 215, the DMS 110 may perform a first consolidate job to create a first merged snapshot E' that includes the data associated with the expired snapshot D and the snapshot E. The DMS 110 may remove the expired snapshot D and the snapshot E from the chain of snapshots of the computing object based on creation on the first merged snapshot E'.

At time 220, the DMS 110 may identify that the snapshot C has expired. At time 225, the DMS 110 may perform a second consolidate job to create a second merged snapshot E" that includes the data associated with the expired snapshot C and the first merged snapshot E'. The DMS 110 may remove the expired snapshot C and the first merged snapshot E' from the chain of snapshots of the computing object based on creation on the second merged snapshot E".

At time 230, the DMS 110 may identify that the snapshot B has expired. At time 235, the DMS 110 may perform a third consolidate job to create a third merged snapshot E'" that includes the data associated with the expired snapshot B and the second merged snapshot E". The DMS 110 may remove the expired snapshot B and the second merged snapshot E" from the chain of snapshots of the computing object based on creation on the third merged snapshot E'".

As described herein, and as shown with respect to FIG. 3, each consolidation job (at time 215, at time 225, and at time 235) may involves multiple read and write operations (e.g., for each data block between the two snapshots to be merged). Thus, consolidate jobs may involve significant IOPS and CPU cycles when performed on a snapshot-by-snapshot basis.

FIG. 3 shows an example of a flow diagram 300 for a consolidation process in accordance with aspects of the present disclosure. The flow diagram 300 may implement one or more aspects of the computing environment 100, the timing diagram 200, or any combination thereof. For example, the flow diagram 300 may be implemented by a DMS 110 which manages snapshots 135 of a computing object which may be stored at one or more storage nodes 185 at the DMS 110 or at one or more node clusters 196 in a cloud environment 195, as described with reference to FIG. 1.

At 305, which may correspond to time 210 of the timing diagram 200 of FIG. 2, the DMS 110 may identify that a snapshot D has expired. The snapshot D may be one of a set of snapshots of a computing object (e.g., snapshot A, snapshot B, snapshot C, snapshot D, and snapshot E) that may be stored at a location accessible to a DMS 110. As described with reference to FIG. 2, snapshot A may be a base snapshot, and snapshot B, snapshot C, snapshot D, and snapshot E may be incremental snapshots. Snapshot A may include data blocks a1, b1, c1, and d1. Data block c2 may be different in snapshot B as compared to data block c1 in snapshot A. Data blocks a1, b1, and d1 may be unchanged for the computing object for the point in time corresponding to snapshot A and snapshot B, and accordingly snapshot B (or the patch file for snapshot B) may include pointers for data blocks a1, b1, and d1 to snapshot A. Similarly, snapshot C may include data blocks a3, b3, and d3 which are different as compared to data blocks a1, b1, and d1, respectively, and snapshot C may include a pointer to data block c2 of snapshot B. Snapshot D may include may include data blocks a4 and c4 which are different as compared to data block a3 of snapshot C and data block c2 of snapshot B, respectively, and snapshot D may include pointers to data block b3 and d3 of snapshot C. Snapshot E may include data blocks b5 and c5 which are different as compared to data blocks b3 of snapshot C and c4 of snapshot D, and snapshot E may include pointers to data block a4 of snapshot D and data block d3 of snapshot C.

At 310, which may correspond to time 215 of the timing diagram 200, based on the expiration of snapshot D, the DMS 110 may perform a consolidate job to merge snapshot D with snapshot E to create a first merged snapshot E'. Merging snapshots may involve keeping the most recent data block from between the pre-merged snapshots (e.g., snapshot D and snapshot E) in the merged snapshot (e.g., snapshot E'). For example, merging snapshot D with snapshot E to create the merged snapshot E' involves: reading data block a4 from snapshot D (as a pointer in snapshot E points to data block a4); reading data block b5 from snapshot E; reading data block c5 from snapshot E; writing data block a4 to the first merged snapshot E'; writing data block b5 to the first merged snapshot E'; and writing data block c5 to the first merged snapshot E'. Assuming each read operation and each write operation involves 1K disk bytes read or written, where checking pointers to data blocks may not involve disk bytes being read or written, the consolidate job at 310 involves 6K disk bytes read or written. As shown, the first merged snapshot E' includes data block a4, data block b5, data block c5, and a pointer to data block d3 of snapshot C. Thus, as described above, the data set Dx of snapshot D which is kept includes data block a4 and the pointer to data block d3, and the data set Ex of snapshot D which is deleted includes the pointer to data block b3 and the data block c4.

At 315, which may correspond to time 220 of the timing diagram 200 of FIG. 2, the DMS 110 may identify that the snapshot C has expired.

At 320, which may correspond to time 225 of the timing diagram 200, based on the expiration of snapshot C, the DMS 110 may perform a consolidate job to merge snapshot C with the first merged snapshot E' to create a second merged snapshot E". Merging snapshot C with the first merged snapshot E'; involves: reading data block a4 from the first merged snapshot E'; reading data block b5 from the first merged snapshot E'; reading data block c5 from the first merged snapshot E'; reading data block d3 from snapshot C (as a pointer in the first merged snapshot E' points to data block d3); writing data block a4 to the second merged snapshot E"; writing data block b5 to the second merged snapshot E"; writing data block c5 to the second merged snapshot E"; and writing data block d3 to the second merged snapshot E". Thus, assuming each read operation and each write operation involves 1K disk bytes read or written, the consolidate job at 320 involves 8K disk bytes read or written. As shown, the second merged snapshot E"; includes data block a4, data block b5, data block c5, and data block d3.

At 325, which may correspond to time 230 of the timing diagram 200 of FIG. 2, the DMS 110 may identify that the snapshot B has expired.

At 330, which may correspond to time 235 of the timing diagram 200, based on the expiration of snapshot B, the DMS 110 may perform a consolidate job to merge snapshot B with the second merged snapshot E" to create a third merged snapshot E'". Merging snapshot B with the second merged snapshot E"; involves: reading data block a4 from the second merged snapshot E"; reading data block b5 from the second merged snapshot E"; reading data block c5 from the second merged snapshot E"; reading data block d3 from the second merged snapshot E"; writing data block a4 to the third merged snapshot E'"; writing data block b5 to the third merged snapshot E'"; writing data block c5 to the third merged snapshot E'"; and writing data block d3 to the third merged snapshot E'". Thus, assuming each read operation and each write operation involves 1K disk bytes read or written, the consolidate job at 330 involves 8K disk bytes read or written. As shown, the third merged snapshot E'"; includes data block a4, data block b5, data block c5, and data block d3.

Thus, assuming each read operation and each write operation involves 1K disk bytes, the three individual consolidate jobs involve 6k+8k+8k=22k disk bytes read or written. As described with reference to FIGS. 4 and 5, the quantity of disk bytes read or written for consolidation purposes may be reduced by deferring consolidate jobs until multiple chained incremental snapshots can be consolidated together.

Figure 4:
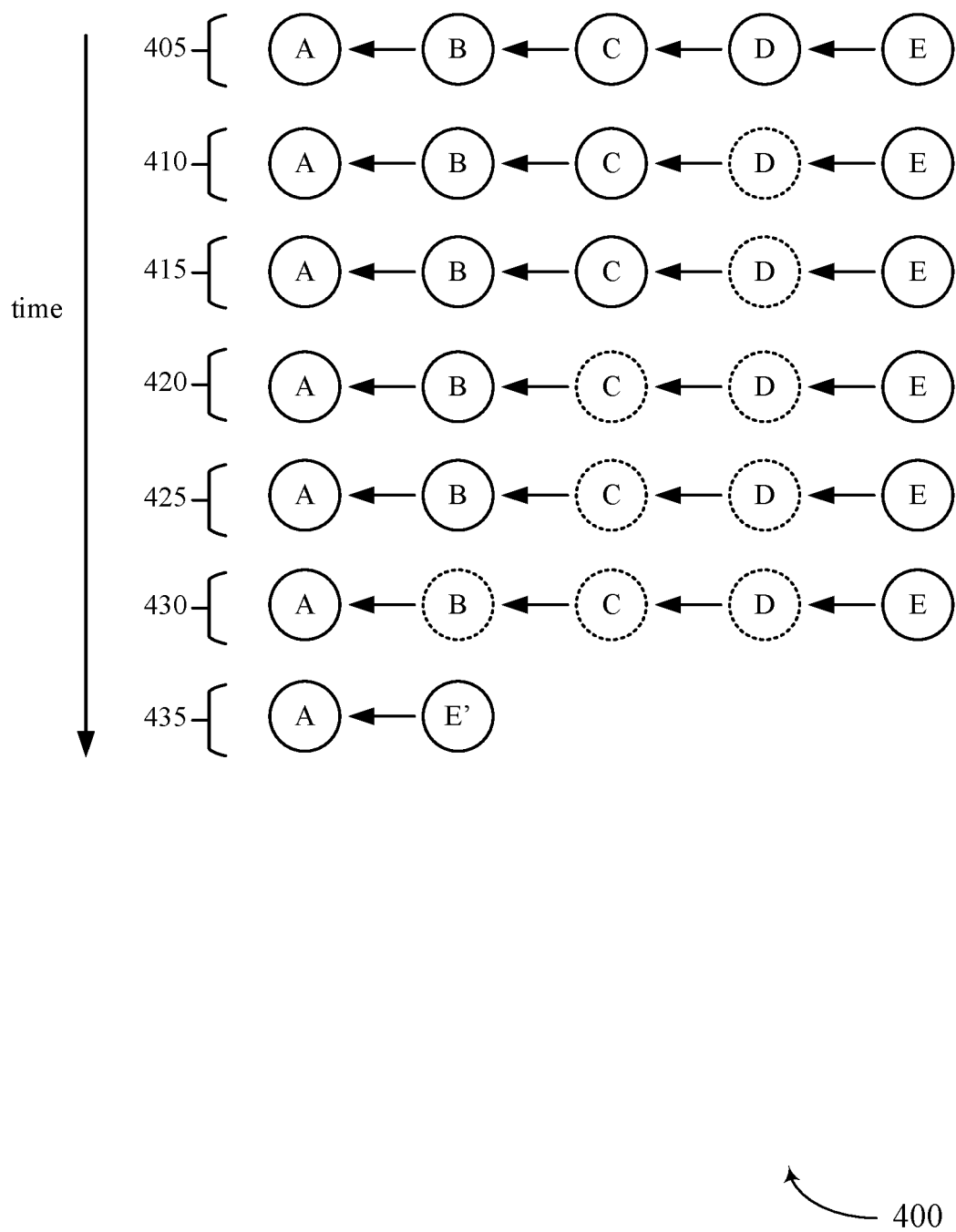
FIG. 4 shows an example of a timing diagram for a batch consolidation process that supports batch consolidation of computing object snapshots in accordance with aspects of the present disclosure.

FIG. 4 shows an example of a timing diagram 400 for a batch consolidation process that supports batch consolidation of computing object snapshots in accordance with aspects of the present disclosure. The timing diagram 400 may implement one or more aspects of the computing environment 100. For example, the timing diagram 400 may be implemented by a DMS 110 which manages snapshots 135 of a computing object which may be stored at one or more storage nodes 185 at the DMS 110 or at one or more node clusters 196 in a cloud environment 195, as described with reference to FIG. 1.

At a first time 405, a set of snapshots of a computing object (e.g., snapshot A, snapshot B, snapshot C, snapshot D, and snapshot E) may be stored at a location accessible to a DMS 110. Snapshot A may be a base snapshot, and snapshot B, snapshot C, snapshot D, and snapshot E may be incremental snapshots.

At time 410, the DMS 110 may identify that the snapshot D has expired. At time 415, the DMS 110 may defer performing a consolidate job for snapshot D. For example, the DMS 110 may check if one or more heuristic thresholds for performance of a consolidate job for the set of snapshots of the computing object are satisfied and may determine that the one or more heuristic thresholds are not satisfied. In some examples, if any of the one or more of the heuristic thresholds are satisfied, the DMS 110 may perform the consolidate job. In some examples, if none of the one or more heuristic thresholds are not satisfied, the DMS 110 may defer the consolidate job. For example, the one or more heuristic thresholds may include chain length (e.g., the quantity of total incremental snapshots of the computing object), the quantity of expired snapshots in the chain of snapshots, the space reclaimable by performance of a consolidation, an amount of free space on the node cluster on which the set of snapshots are stored, an age of expired snapshots in the chain, a total storage size of the set of snapshots, or a duration until a next snapshot in the set of snapshots expires.

At time 420, the DMS 110 may identify that the snapshot C has expired. At time 425, the DMS 110 may defer performing a consolidate job for expired snapshots D and C. For example, the DMS 110 may determine that the one or more heuristic thresholds for performance of the consolidate job for the set of snapshots of the computing object are not satisfied. For example, the DMS may defer performing the consolidate job for expired snapshots D and C at time 425 if none of the one or more heuristic thresholds are satisfied.

At time 430, the DMS 110 may identify that the snapshot C has expired. At time 435, the DMS 110 may perform a consolidate job for expired snapshots D, C, and B. For example, the DMS 110 may determine that the one or more heuristic thresholds for performance of the consolidate job for the set of snapshots of the computing object are satisfied. Accordingly, at time 435, the DMS 110 may create a merged snapshot E' that includes data from the expired snapshots D, C, and B and the unexpired snapshot E. The DMS 110 may remove the snapshots D, C, and B and the unexpired snapshot E from the chain of snapshots based on the creation of the merged snapshot E'.

Figure 5:
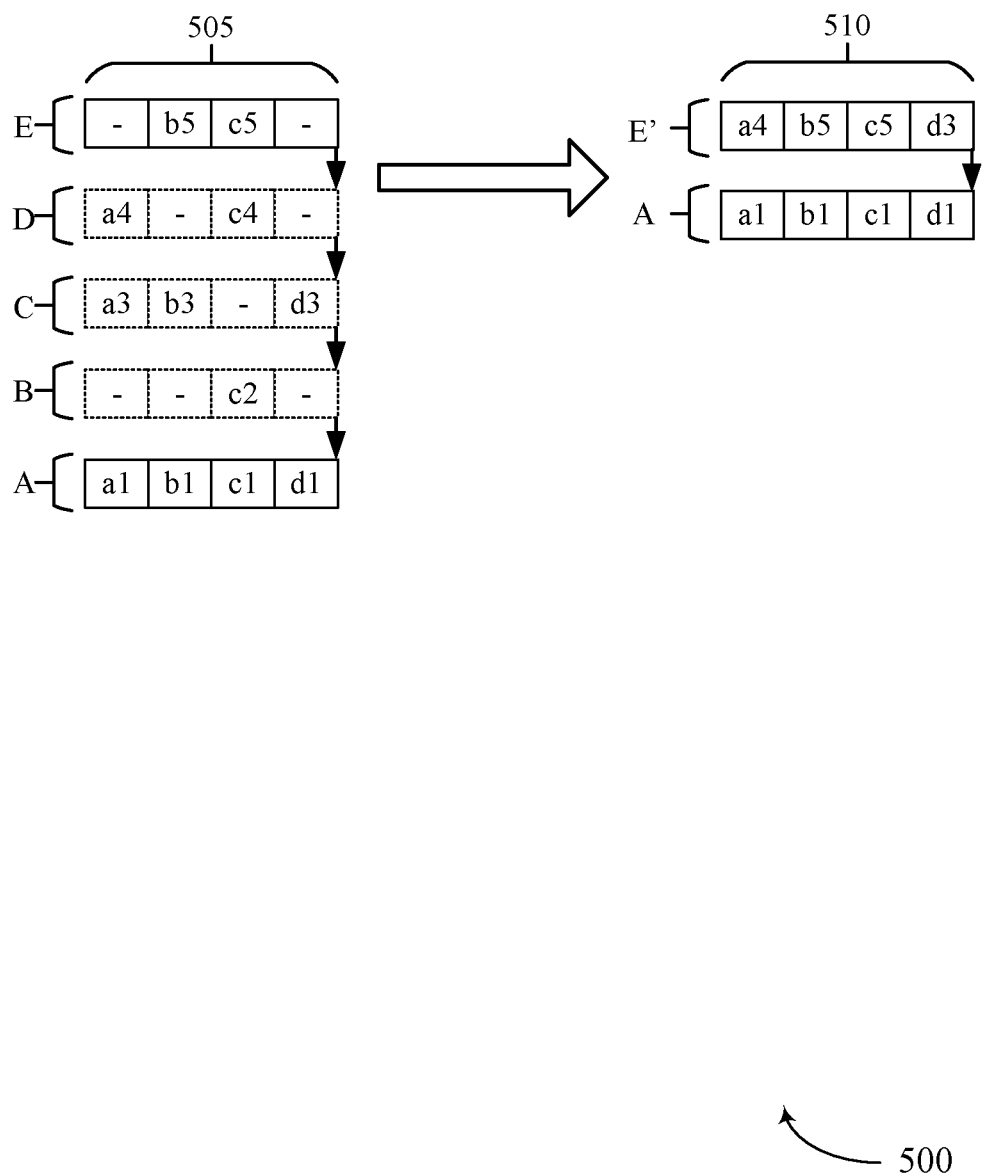
FIG. 5 shows an example of a flow diagram for a batch consolidation process that supports batch consolidation of computing object snapshots in accordance with aspects of the present disclosure.

FIG. 5 shows an example of a flow diagram 500 for a batch consolidation process that supports batch consolidation of computing object snapshots in accordance with aspects of the present disclosure. The flow diagram 500 may implement one or more aspects of the computing environment 100, the timing diagram 400, or any combination thereof. For example, the flow diagram 500 may be implemented by a DMS 110 which manages snapshots 135 of a computing object which may be stored at one or more storage nodes 185 at the DMS 110 or at one or more node clusters 196 in a cloud environment 195, as described with reference to FIG. 1.

At 505, which may correspond to time 430 of the timing diagram 200 of FIG. 2, the DMS 110 may determine that one or more heuristic thresholds for performance of a consolidate job for a set of snapshots of a computing object are satisfied. For example, the set of snapshots may include snapshot A, snapshot B, snapshot C, snapshot D, and snapshot E. As described with reference to FIG. 4, snapshot A may be a base snapshot, and snapshot B, snapshot C, snapshot D, and snapshot E may be incremental snapshots. At 505, snapshot D, snapshot C, and snapshot B may be expired. For example, the DMS 110 may have deferred consolidate jobs after the expiration of snapshot D and the expiration of snapshot C based on one or more heuristic thresholds.

Snapshot A may include data blocks a1, b1, c1, and d1. Data block c2 may be different in snapshot B as compared to data block c1 in snapshot A. Data blocks a1, b1, and d1 may be unchanged for the computing object for the point in time corresponding to snapshot A and snapshot B, and accordingly snapshot B (or the patch file for snapshot B) may include pointers for data blocks a1, b1, and d1 of snapshot A. Similarly, snapshot C may include data blocks a3, b3, and d3 which are different as compared to data blocks a1, b1, and d1, respectively, and snapshot C may include a pointer to data block c2 of snapshot B. Snapshot D may include may include data blocks a4 and c4 which are different as compared to data block a3 of snapshot C and data block c2 of snapshot B, respectively, and snapshot D may include pointers to data block b3 and d3 of snapshot C. Snapshot E may include data blocks b5 and c5 which are different as compared to data blocks b3 of snapshot C and c4 of snapshot D, and snapshot E may include pointers to data block a4 of snapshot D and data block d3 of snapshot C.

At 510, which may correspond to time 435 of the timing diagram 400 of FIG. 4, the DMS 110 may perform a consolidate job to merge expired snapshot D, expired snapshot C, expired snapshot B and snapshot E to create a merged snapshot E' (e.g., the DMS 110 may perform a batch consolidation). For example, merging expired snapshot D, expired snapshot C, expired snapshot B, and snapshot E involves: reading data block a4 from snapshot D (as a pointer in snapshot E points to data block a4); reading data block b5 from snapshot E; reading data block c5 from snapshot E; reading data block d3 from snapshot C (as a pointer in snapshot E points to a "hole" in snapshot D which corresponds to data block d3 in snapshot C); writing data block a4 to the merged snapshot E'; writing data block b5 to the merged snapshot E'; writing data block c5 to the merged snapshot E'; and writing data block d3 to the merged snapshot E'. Thus, assuming each read operation and each write operation involves 1K disk bytes read or written, the consolidate job at 510 that merges expired snapshot D, expired snapshot C, expired snapshot B and snapshot E involves 8K disk bytes read or written. Hence, deferring the consolidate jobs for expired snapshot D and expired snapshot E as compared to the snapshot-by-snapshot consolidation approach shown in flow diagram of FIG. 3 (which involves 22 disk bytes read or written), and instead performing a batch consolidation renders savings of 14K disk bytes read or written.

Running a consolidate job after expiration of each snapshot in a chain of snapshots (e.g., as described with reference to FIGS. 2 and 3) may aggressively reclaim storage space in a next cycle after expiration of each snapshot. The consolidate job that is run after each snapshot expiration may read patch files for the expired snapshots and the patch files for the next snapshot in the chain (e.g., the unexpired snapshot to be merged with the expired snapshot) and may write a new patch file for the next snapshot in the chain. Such frequent access of data block contents in patch files may lead to high disk IOPs utilization. Use of heuristic thresholds to defer consolidate jobs, as described herein, may allow for batch consolidation of multiple chained snapshots and accordingly may decrease the frequency of accessing data blocks for consolidation processes. For example, the amount of disk bytes read or written for consolidation processes may be reduced by 30 percent to 60 percent by implementing heuristic thresholds to defer consolidate jobs.

Read operations may involve decompressing data and writing operations may involve compressing and fingerprinting data, each of which involves high CPU usage. Thus, reducing the quantity of read and write operations by deferring consolidate jobs until multiple chained incremental snapshots can be consolidated together may bring down CPU load. The longer consolidate jobs are deferred, and accordingly the more expired snapshots that can be consolidated together, the more the CPU load may be reduced. Additionally, or alternatively, reducing the frequency of consolidate jobs by deferring consolidate jobs until multiple chained incremental snapshots can be consolidated together may reduce reservations of temporary space (e.g., semaphores) associated with consolidate jobs. Reducing reservations of temporary space may free space for other low priority background jobs associated with recovery performance and deduplication for the DMS 110.

Figure 6:
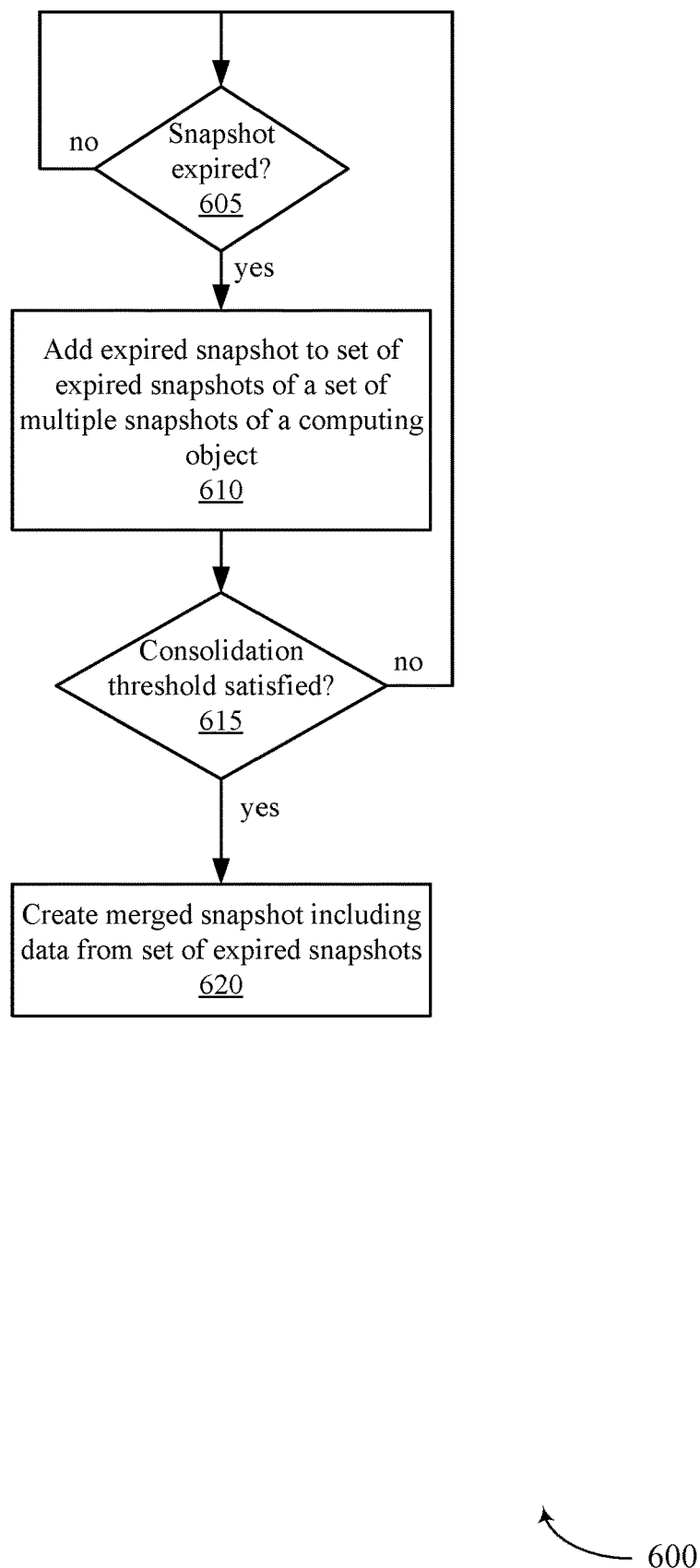
FIG. 6 shows an example of a flowchart that supports batch consolidation of computing object snapshots in accordance with aspects of the present disclosure.

FIG. 6 shows an example of a flowchart 600 that supports batch consolidation of computing object snapshots in accordance with aspects of the present disclosure. The flowchart 600 may implement one or more aspects of the computing environment 100. For example, the flowchart 600 may be implemented by a DMS 110 which manages snapshots 135 of a computing object which may be stored at one or more storage nodes 185 at the DMS 110 or at one or more node clusters 196 in a cloud environment 195, as described with reference to FIG. 1.

At 605, the DMS 110 may check whether an incremental snapshot of a computing object has expired. The incremental snapshot may be one of a set of multiple (e.g., a chain) of snapshots of the computing object that are accessible to the DMS 110. For example, a service level agreement (SLA) for a customer may identify how long to store snapshots until the snapshots expire (e.g., days, weeks, months). A customer may change an SLA, which may change expiry times for snapshots. As another example, the expiry time of a snapshot may be indicated at the time of creation of the snapshot or at promotion of a snapshot. In each case, the DMS 110 may either store or be able to look up the expiry time of each snapshot. At 605, if the DMS 110 identifies that an incremental snapshot has expired, at 610 the DMS 110 may add the expired snapshot to a set of expired incremental snapshots of the set of multiple snapshots of the computing object. In some examples, at 605, if the DMS 110 determines that no snapshot has expired, the DMS 110 may check again later (e.g., periodically).

At 615, the DMS 110 may determine whether one or more consolidation thresholds for the set of expired incremental snapshots are satisfied. In some examples, when a snapshot expires (e.g., at 605), a delete call may be made by the DMS 110 (e.g., to a application programming interface (API) for the snapshot chain management layer) for the corresponding expired snapshot, and the actual expiry time may be noted by the snapshot chain management layer. In such examples, the DMS 110 may trigger the determination at 615 based on the delete call (e.g., the determination at 615 may be triggered based on the identification at 605 that an incremental snapshot has expired). In some examples, the DMS 110 may periodically check if the one or more consolidation thresholds for the set of expired incremental snapshots are satisfied (e.g., may periodically perform the determination at 615).

If the DMS 110 determines at 615 that the one or more consolidation thresholds for the set of expired incremental snapshots are satisfied, then at 620 the DMS may create a merged snapshot that includes data associated with the set of expired incremental snapshots and data associated with an unexpired snapshot included in the set of multiple snapshots of the computing object (e.g., the DMS 110 may perform a consolidate job for the set of expired incremental snapshots). As described herein, creating the merged snapshot may include selecting most recent versions of data blocks from among the set of expired incremental snapshots and the unexpired snapshot for inclusion in the merged snapshot. Based on creation of the merged snapshot, the DMS 110 may remove the set of expired snapshots and the unexpired snapshot from the storage cluster at which the snapshots of the computing object are stored. If the DMS 110 determines at 615 that the one or more consolidation thresholds for the set of expired incremental snapshots are satisfied, the DMS 110 may refrain from performing a consolidate job and may return to 605 to check if additional snapshots have expired.

In some examples, the one or more heuristic thresholds may include a threshold duration until expiration of a next incremental snapshot. For example, given a chain of N expired incremental snapshots and one active incremental snapshot, the DMS 110 may defer consolidation (e.g., determine that the heuristic threshold is satisfied) if the chain can be extended either up (e.g., the active snapshot is more recent) or down the chain (the active snapshot is less recent) by adding the active incremental snapshot as the active snapshot is scheduled to expire within the threshold duration (e.g., 8 hours).

In some examples, the one or more heuristic thresholds may include a threshold quantity of expired snapshots (e.g., 5 snapshots). In some examples, the one or more heuristic thresholds may include an age of the oldest (e.g., temporally first) expired incremental snapshot. In some examples, the one or more heuristic thresholds may include a time period since expiration of a temporally earliest incremental snapshot of the set of expired incremental snapshots (e.g., 8 hours).

In some examples, the one or more heuristic thresholds may include an amount of available storage space within a storage system (e.g., a node cluster) at which the set of multiple snapshots of the computing object are stored. For example, the DMS 110 may defer consolidation at 615 if at least 20% of the total storage space in the storage system is available.

In some examples, the one or more heuristic thresholds may include a collective data size for the set of expired incremental snapshots, which may be relative to the storage space of the storage system at which the set of multiple snapshots of the computing object are stored. For example, the DMS 110 may defer consolidation at 615 if less than 10 percent of the total storage space used by the chain of snapshots is used by the set of expired incremental snapshots. For example, if the chain of snapshots corresponds to 1 TB of data, the threshold may be 100 GB of data for the set of expired incremental snapshots.

In some examples, a monotonous clock may be used for tracking the actual expiry times of snapshots at 605 and 615, as the expected expiry time may be managed at a snapshot layer which may follow a system clock and may not be resilient to time jumps (e.g., due to daylight savings time or network time protocol updates). The monotonous clock may be managed at the DMS 110 or a snapshot chain management layer to track the actual expiry time to avoid infinitely deferring consolidation of any snapshot content due to time jumps.

Figure 7:
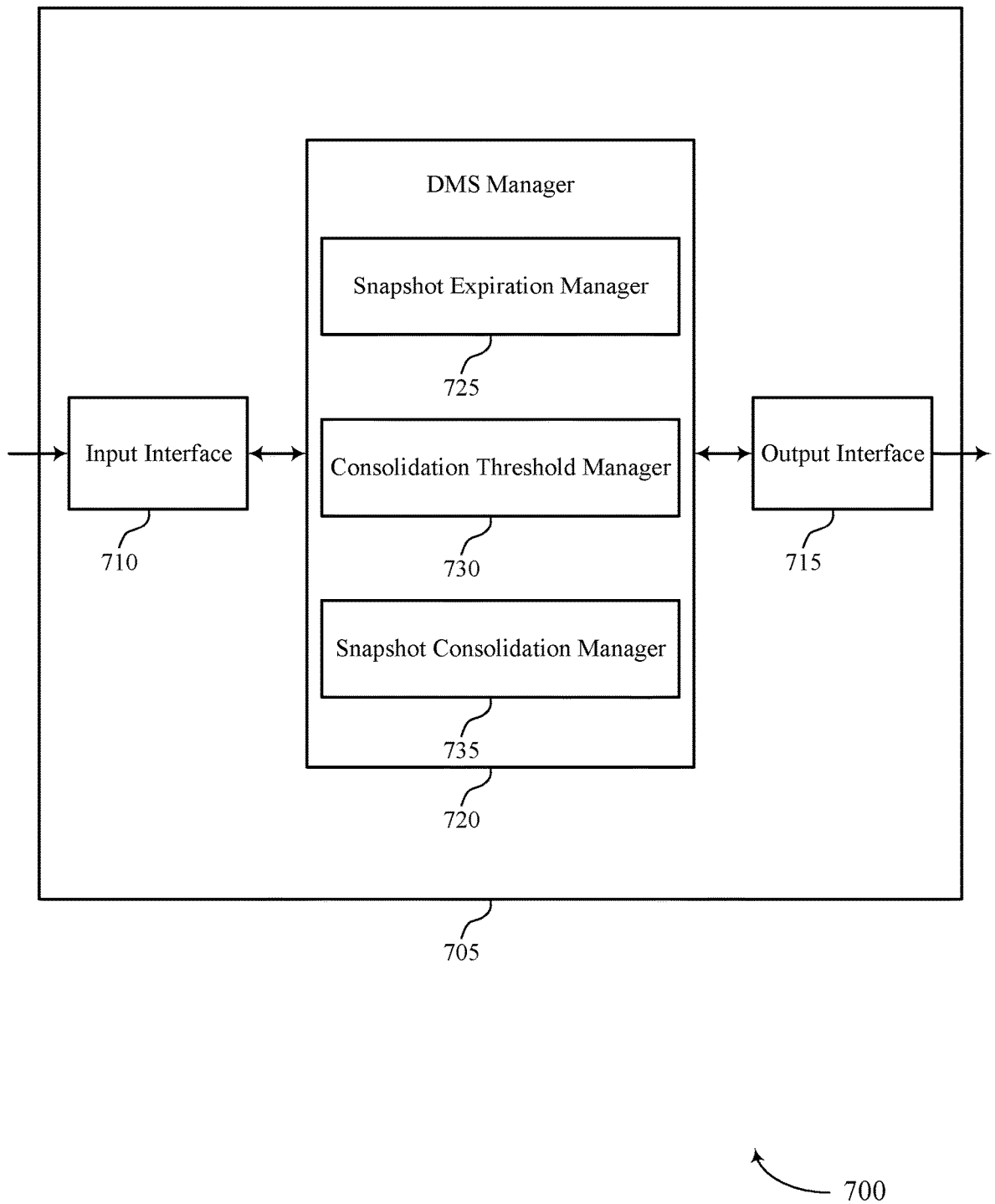
FIG. 7 shows a block diagram of an apparatus that supports batch consolidation of computing object snapshots in accordance with aspects of the present disclosure.

FIG. 7 shows a block diagram 700 of a system 705 that supports batch consolidation of computing object snapshots in accordance with aspects of the present disclosure. In some examples, the system 705 may be an example of aspects of one or more components described with reference to FIG. 1, such as a DMS 110. The system 705 may include an input interface 710, an output interface 715, and a DMS manager 720. The DMS manager may be an example of a DMS manager 190 described with reference to FIG. 1. The system 705 may also include one or more processors. Each of these components may be in communication with one another (e.g., via one or more buses, communications links, communications interfaces, or any combination thereof).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710 may transmit such corresponding signaling to the DMS manager 720 to support batch consolidation of computing object snapshots. In some cases, the input interface 710 may be a component of a network interface 925 as described with reference to FIG. 9.

The output interface 715 may manage output signaling for the system 705. For example, the output interface 715 may receive signaling from other components of the system 705, such as the DMS manager 720, and may transmit such output signaling corresponding to (e.g., representative of or otherwise based on) such signaling to other systems or devices. In some cases, the output interface 715 may be a component of a network interface 925 as described with reference to FIG. 9.

For example, the DMS manager 720 may include a snapshot expiration manager 725, a consolidation threshold manager 730, a snapshot consolidation manager 735, or any combination thereof. In some examples, the DMS manager 720, or various components thereof, may be configured to perform various operations (e.g., receiving, monitoring, transmitting) using or otherwise in cooperation with the input interface 710, the output interface 715, or both. For example, the DMS manager 720 may receive information from the input interface 710, send information to the output interface 715, or be integrated in combination with the input interface 710, the output interface 715, or both to receive information, transmit information, or perform various other operations as described herein.

The snapshot expiration manager 725 may be configured as or otherwise support a means for identifying, by a DMS, an expiration of a first incremental snapshot of a computing object, the first incremental snapshot being one of a set of multiple snapshots of the computing object accessible to the DMS. The consolidation threshold manager 730 may be configured as or otherwise support a means for determining, by the DMS after the expiration of the first incremental snapshot, satisfaction of one or more consolidation thresholds for a set of expired incremental snapshots included in the set of multiple snapshots, the set of expired incremental snapshots including the first incremental snapshot. The snapshot consolidation manager 735 may be configured as or otherwise support a means for creating, by the DMS and based on determining of the satisfaction of the one or more consolidation thresholds, a merged snapshot including data associated with the set of expired incremental snapshots and data associated with an unexpired snapshot included in the set of multiple snapshots.

Figure 8:
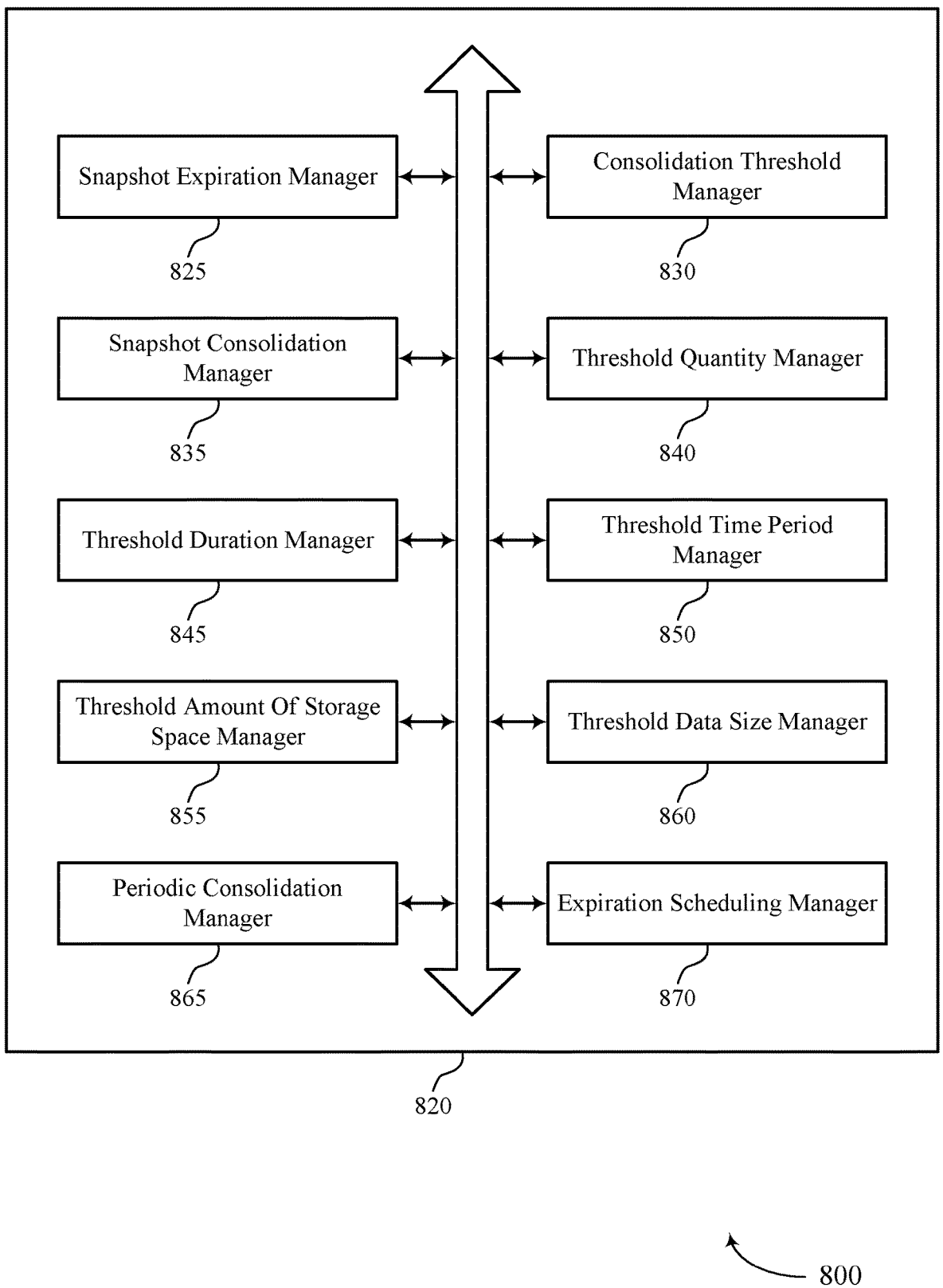
FIG. 8 shows a block diagram of a data management system (DMS) that supports batch consolidation of computing object snapshots in accordance with aspects of the present disclosure.

FIG. 8 shows a block diagram 800 of a DMS manager 820 that supports batch consolidation of computing object snapshots in accordance with aspects of the present disclosure. The DMS manager 820 may be an example of aspects of a DMS manager 190 or a DMS manager 720, or both, as described herein. The DMS manager 820, or various components thereof, may be an example of means for performing various aspects of batch consolidation of computing object snapshots as described herein. For example, the DMS manager 820 may include a snapshot expiration manager 825, a consolidation threshold manager 830, a snapshot consolidation manager 835, a threshold quantity manager 840, a threshold duration manager 845, a threshold time period manager 850, a threshold amount of storage space manager 855, a threshold data size manager 860, a periodic consolidation manager 865, an expiration scheduling manager 870, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot expiration manager 825 may be configured as or otherwise support a means for identifying, by a DMS, an expiration of a first incremental snapshot of a computing object, the first incremental snapshot being one of a set of multiple snapshots of the computing object accessible to the DMS. The consolidation threshold manager 830 may be configured as or otherwise support a means for determining, by the DMS after the expiration of the first incremental snapshot, satisfaction of one or more consolidation thresholds for a set of expired incremental snapshots included in the set of multiple snapshots, the set of expired incremental snapshots including the first incremental snapshot. The snapshot consolidation manager 835 may be configured as or otherwise support a means for creating, by the DMS and based on determining of the satisfaction of the one or more consolidation thresholds, a merged snapshot including data associated with the set of expired incremental snapshots and data associated with an unexpired snapshot included in the set of multiple snapshots.

In some examples, to support creating the merged snapshot, the snapshot consolidation manager 835 may be configured as or otherwise support a means for selecting most recent versions of data blocks from among the set of expired incremental snapshots and the unexpired snapshot for inclusion in the merged snapshot.

In some examples, to support determining the satisfaction of the one or more consolidation thresholds, the threshold quantity manager 840 may be configured as or otherwise support a means for determining that a quantity of expired incremental snapshots of the set of expired incremental snapshots exceeds a threshold quantity, the one or more consolidation thresholds including the threshold quantity.

In some examples, to support determining the satisfaction of the one or more consolidation thresholds, the threshold duration manager 845 may be configured as or otherwise support a means for determining that a duration until expiration of a next incremental snapshot of the set of multiple snapshots is greater than a threshold duration, the one or more consolidation thresholds including the threshold duration.

In some examples, to support determining the satisfaction of the one or more consolidation thresholds, the threshold time period manager 850 may be configured as or otherwise support a means for determining that a time period since expiration of a temporally earliest incremental snapshot of the set of expired incremental snapshots exceeds a threshold time period, the one or more consolidation thresholds including the threshold time period.

In some examples, to support determining the satisfaction of the one or more consolidation thresholds, the threshold amount of storage space manager 855 may be configured as or otherwise support a means for determining that an amount of available storage space within a storage system at which the set of multiple snapshots are stored is less than a threshold amount of storage space, the one or more consolidation thresholds including the threshold amount of storage space.

In some examples, to support determining the satisfaction of the one or more consolidation thresholds, the threshold data size manager 860 may be configured as or otherwise support a means for determining that a collective data size of the set of expired incremental snapshots exceeds a threshold data size, the one or more consolidation thresholds including the threshold data size.

In some examples, the consolidation threshold manager 830 may be configured as or otherwise support a means for determining, by the DMS at a first time prior to the expiration of the first incremental snapshot of the computing object, that the one or more consolidation thresholds are not satisfied for one or more previously expired incremental snapshots, the set of expired incremental snapshots comprising the one or more previously expired incremental snapshots and the first incremental snapshot. In some examples, the snapshot consolidation manager 835 may be configured as or otherwise support a means for refraining, by the DMS, from creating any merged snapshot at the first time based on determining that the one or more consolidation thresholds are not satisfied as of the first time.

In some examples, the periodic consolidation manager 865 may be configured as or otherwise support a means for determining, by the DMS and based on a clock of a storage system at which the set of multiple snapshots are stored, that a time period for a periodic consolidation operation is satisfied, where determining the satisfaction of the one or more consolidation thresholds is responsive to determining that the time period for the periodic consolidation operation is satisfied.

In some examples, determining the satisfaction of the one or more consolidation thresholds is responsive to identifying the expiration of the first incremental snapshot.

In some examples, the expiration scheduling manager 870 may be configured as or otherwise support a means for receiving, by the DMS, scheduling information for expiration of the set of multiple snapshots, where identifying the expiration of the first incremental snapshot is based on the scheduling information.

Figure 9:
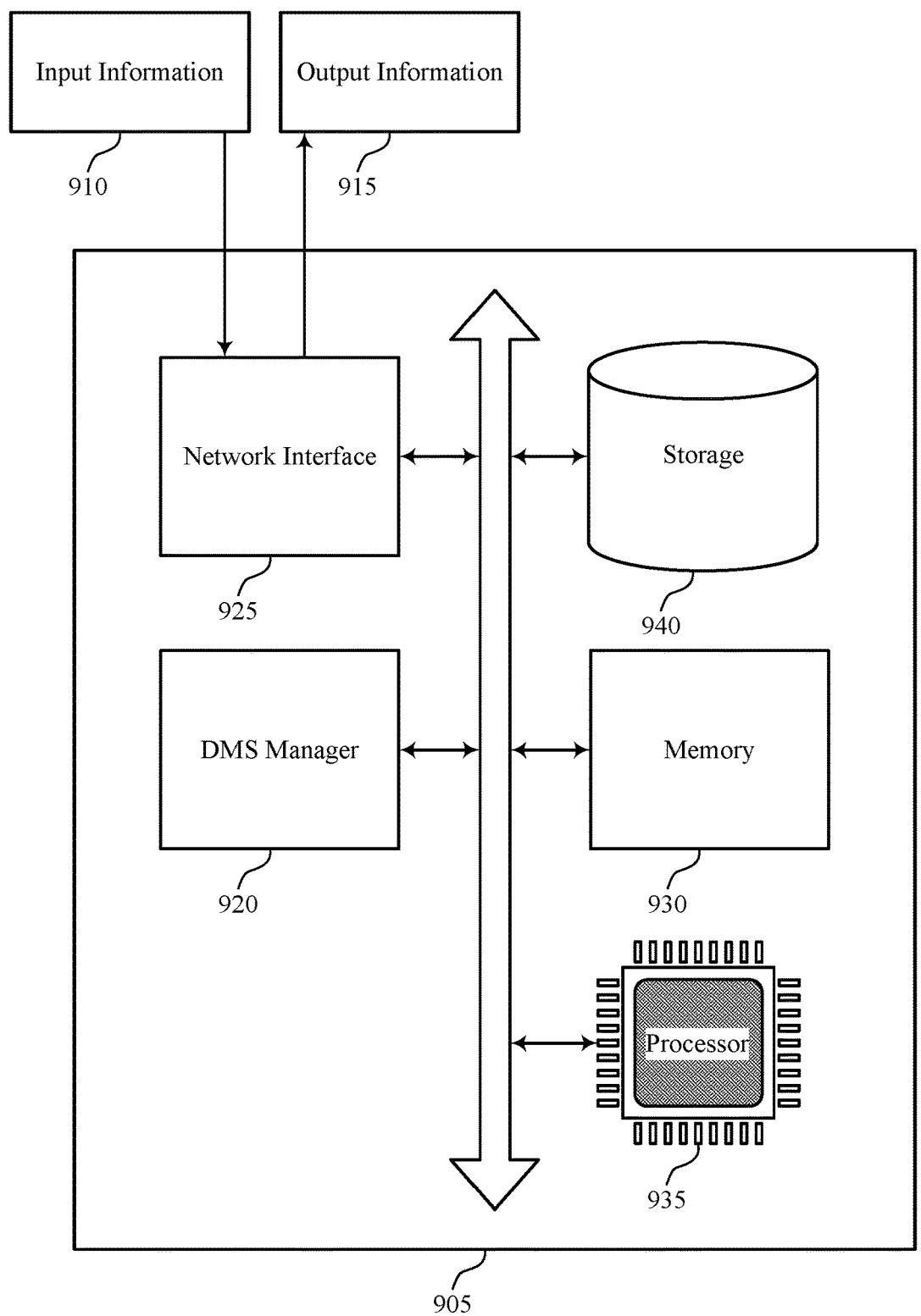
FIG. 9 shows a diagram of a system including a device that supports batch consolidation of computing object snapshots in accordance with aspects of the present disclosure.

FIG. 9 shows a block diagram 900 of a system 905 that supports batch consolidation of computing object snapshots in accordance with aspects of the present disclosure. The system 905 may be an example of or include the components of a system 705 as described herein. The system 905 may include components for data management, including components such as a DMS manager 920, an input information 910, an output information 915, a network interface 925, at least one memory 930, at least one processor 935, and a storage 940. These components may be in electronic communication or otherwise coupled with each other (e.g., operatively, communicatively, functionally, electronically, electrically; via one or more buses, communications links, communications interfaces, or any combination thereof). Additionally, the components of the system 905 may include corresponding physical components or may be implemented as corresponding virtual components (e.g., components of one or more virtual machines). In some examples, the system 905 may be an example of aspects of one or more components described with reference to FIG. 1, such as a DMS 110.

The network interface 925 may enable the system 905 to exchange information (e.g., input information 910, output information 915, or both) with other systems or devices (not shown). For example, the network interface 925 may enable the system 905 to connect to a network (e.g., a network 120 as described herein). The network interface 925 may include one or more wireless network interfaces, one or more wired network interfaces, or any combination thereof. In some examples, the network interface 925 may be an example of may be an example of aspects of one or more components described with reference to FIG. 1, such as one or more network interfaces 165.

Memory 930 may include RAM, ROM, or both. The memory 930 may store computer-readable, computer-executable software including instructions that, when executed, cause the processor 935 to perform various functions described herein. In some cases, the memory 930 may contain, among other things, a basic input/output system (BIOS), which may control basic hardware or software operation such as the interaction with peripheral components or devices. In some cases, the memory 930 may be an example of aspects of one or more components described with reference to FIG. 1, such as one or more memories 175.

The processor 935 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 935 may be configured to execute computer-readable instructions stored in a memory 930 to perform various functions (e.g., functions or tasks supporting batch consolidation of computing object snapshots). Though a single processor 935 is depicted in the example of FIG. 9, it is to be understood that the system 905 may include any quantity of one or more of processors 935 and that a group of processors 935 may collectively perform one or more functions ascribed herein to a processor, such as the processor 935. In some cases, the processor 935 may be an example of aspects of one or more components described with reference to FIG. 1, such as one or more processors 170.

Storage 940 may be configured to store data that is generated, processed, stored, or otherwise used by the system 905. In some cases, the storage 940 may include one or more HDDs, one or more SDDs, or both. In some examples, the storage 940 may be an example of a single database, a distributed database, multiple distributed databases, a data store, a data lake, or an emergency backup database. In some examples, the storage 940 may be an example of one or more components described with reference to FIG. 1, such as one or more network disks 180.

For example, the DMS manager 920 may be configured as or otherwise support a means for identifying, by a DMS, an expiration of a first incremental snapshot of a computing object, the first incremental snapshot being one of a set of multiple snapshots of the computing object accessible to the DMS. The DMS manager 920 may be configured as or otherwise support a means for determining, by the DMS after the expiration of the first incremental snapshot, satisfaction of one or more consolidation thresholds for a set of expired incremental snapshots included in the set of multiple snapshots, the set of expired incremental snapshots including the first incremental snapshot. The DMS manager 920 may be configured as or otherwise support a means for creating, by the DMS and based on determining of the satisfaction of the one or more consolidation thresholds, a merged snapshot including data associated with the set of expired incremental snapshots and data associated with an unexpired snapshot included in the set of multiple snapshots.

By including or configuring the DMS manager 920 in accordance with examples as described herein, the system 905 may support techniques for batch consolidation of computing object snapshots, which may provide one or more benefits such as, for example, more efficient utilization of computing resources, network resources or both, and improved scalability among other possibilities.

Figure 10:
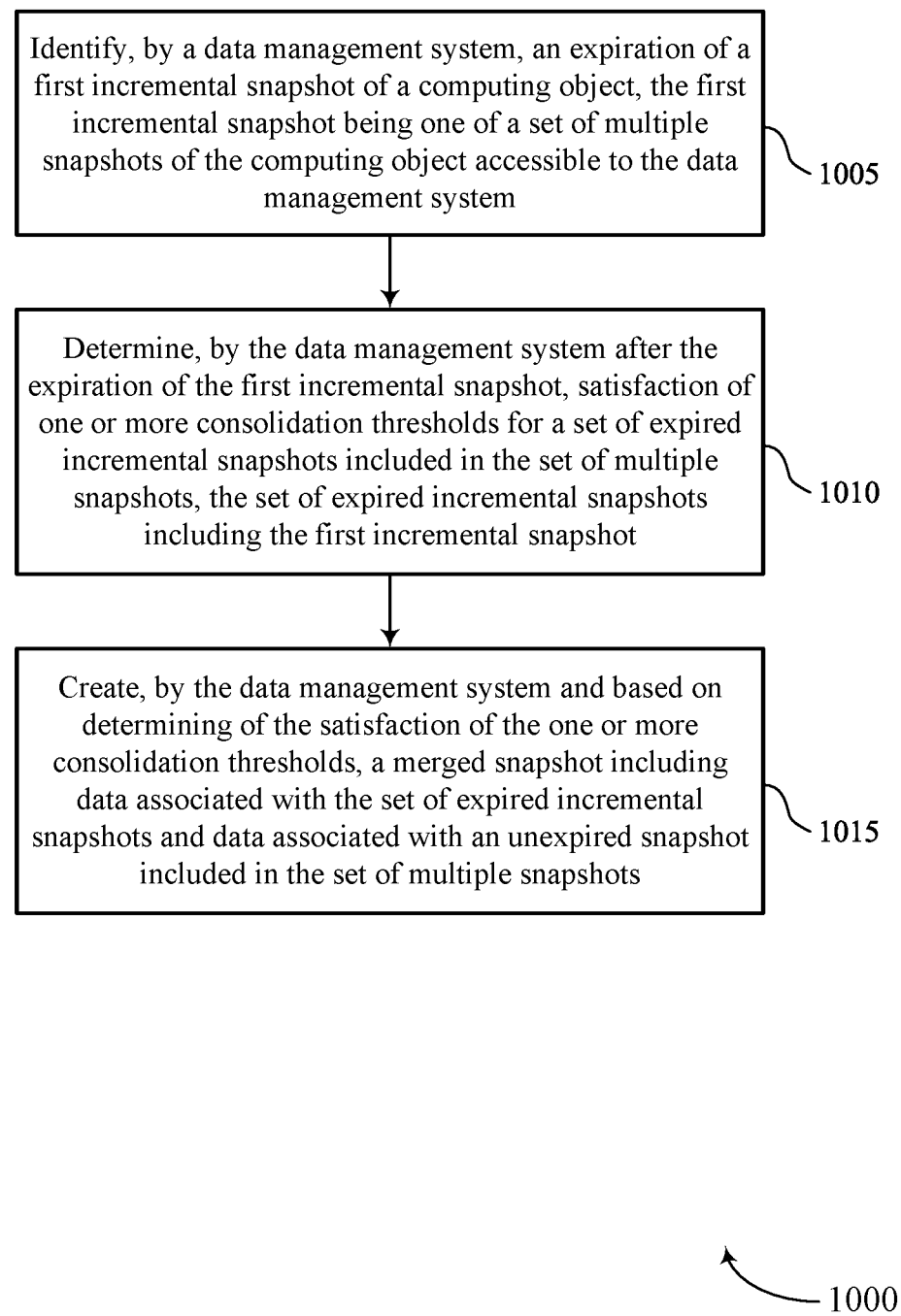
FIGS. 10 through 12 show flowcharts illustrating methods that support batch consolidation of computing object snapshots in accordance with aspects of the present disclosure.

FIG. 10 shows a flowchart illustrating a method 1000 that supports batch consolidation of computing object snapshots in accordance with aspects of the present disclosure. The operations of the method 1000 may be implemented by a DMS or its components as described herein. For example, the operations of the method 1000 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1005, the method may include identifying, by a DMS, an expiration of a first incremental snapshot of a computing object, the first incremental snapshot being one of a set of multiple snapshots of the computing object accessible to the DMS. The operations of block 1005 may be performed in accordance with examples as disclosed herein. In some examples, aspects of the operations of 1005 may be performed by a snapshot expiration manager 825 as described with reference to FIG. 8.

At 1010, the method may include determining, by the DMS after the expiration of the first incremental snapshot, satisfaction of one or more consolidation thresholds for a set of expired incremental snapshots included in the set of multiple snapshots, the set of expired incremental snapshots including the first incremental snapshot. The operations of block 1010 may be performed in accordance with examples as disclosed herein. In some examples, aspects of the operations of 1010 may be performed by a consolidation threshold manager 830 as described with reference to FIG. 8.

At 1015, the method may include creating, by the DMS and based on determining of the satisfaction of the one or more consolidation thresholds, a merged snapshot including data associated with the set of expired incremental snapshots and data associated with an unexpired snapshot included in the set of multiple snapshots. The operations of block 1015 may be performed in accordance with examples as disclosed herein. In some examples, aspects of the operations of 1015 may be performed by a snapshot consolidation manager 835 as described with reference to FIG. 8.

Figure 11:
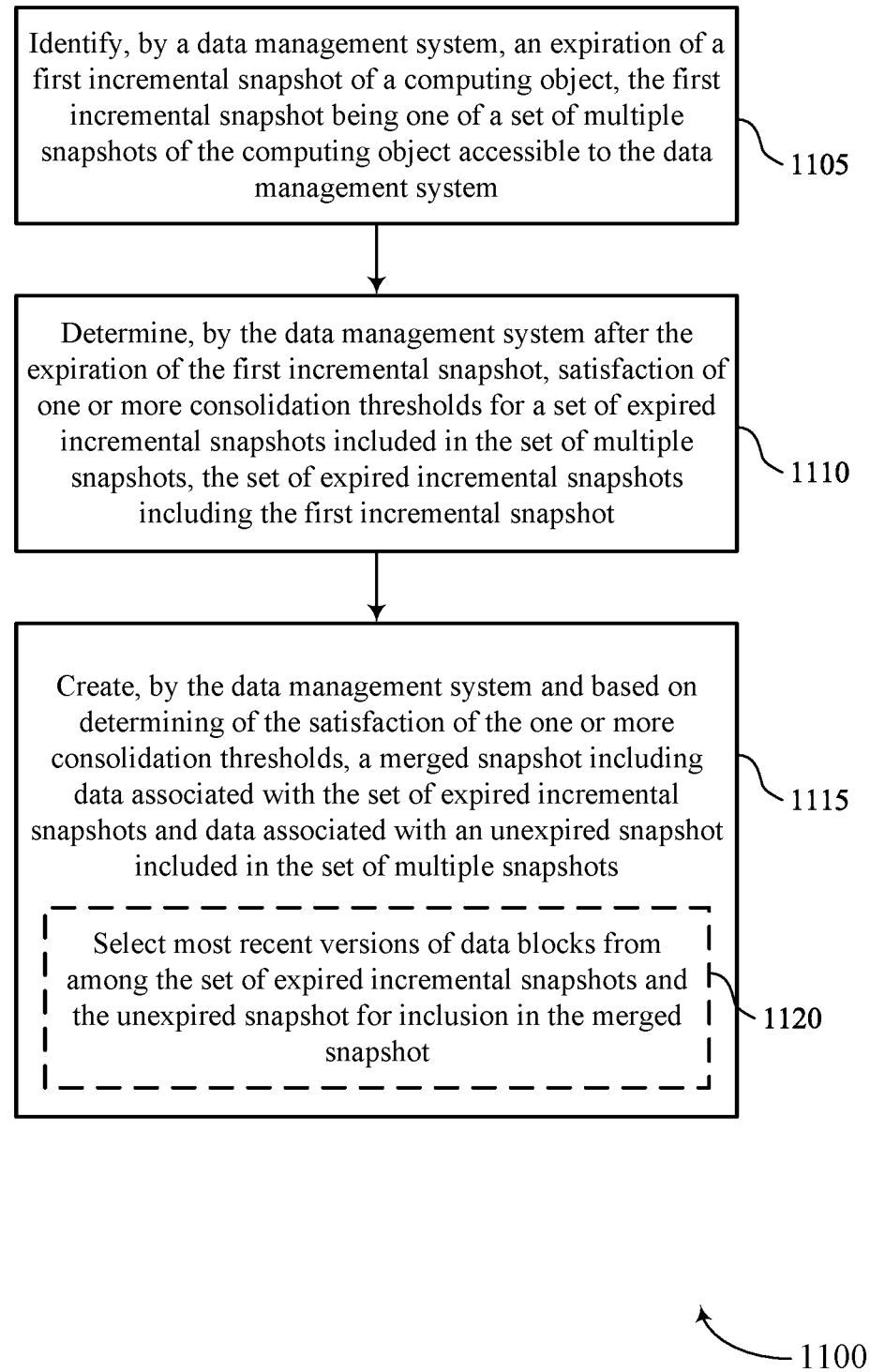

FIG. 11 shows a flowchart illustrating a method 1100 that supports batch consolidation of computing object snapshots in accordance with aspects of the present disclosure. The operations of the method 1100 may be implemented by a DMS or its components as described herein. For example, the operations of the method 1100 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1105, the method may include identifying, by a DMS, an expiration of a first incremental snapshot of a computing object, the first incremental snapshot being one of a set of multiple snapshots of the computing object accessible to the DMS. The operations of block 1105 may be performed in accordance with examples as disclosed herein. In some examples, aspects of the operations of 1105 may be performed by a snapshot expiration manager 825 as described with reference to FIG. 8.

At 1110, the method may include determining, by the DMS after the expiration of the first incremental snapshot, satisfaction of one or more consolidation thresholds for a set of expired incremental snapshots included in the set of multiple snapshots, the set of expired incremental snapshots including the first incremental snapshot. The operations of block 1110 may be performed in accordance with examples as disclosed herein. In some examples, aspects of the operations of 1110 may be performed by a consolidation threshold manager 830 as described with reference to FIG. 8.

At 1115, the method may include creating, by the DMS and based on determining of the satisfaction of the one or more consolidation thresholds, a merged snapshot including data associated with the set of expired incremental snapshots and data associated with an unexpired snapshot included in the set of multiple snapshots. The operations of block 1115 may be performed in accordance with examples as disclosed herein. In some examples, aspects of the operations of 1115 may be performed by a snapshot consolidation manager 835 as described with reference to FIG. 8.

In some cases, creating the merged snapshot may include, at 1120, selecting most recent versions of data blocks from among the set of expired incremental snapshots and the unexpired snapshot for inclusion in the merged snapshot. The operations of block 1120 may be performed in accordance with examples as disclosed herein. In some examples, aspects of the operations of 1120 may be performed by a snapshot consolidation manager 835 as described with reference to FIG. 8.

Figure 12:
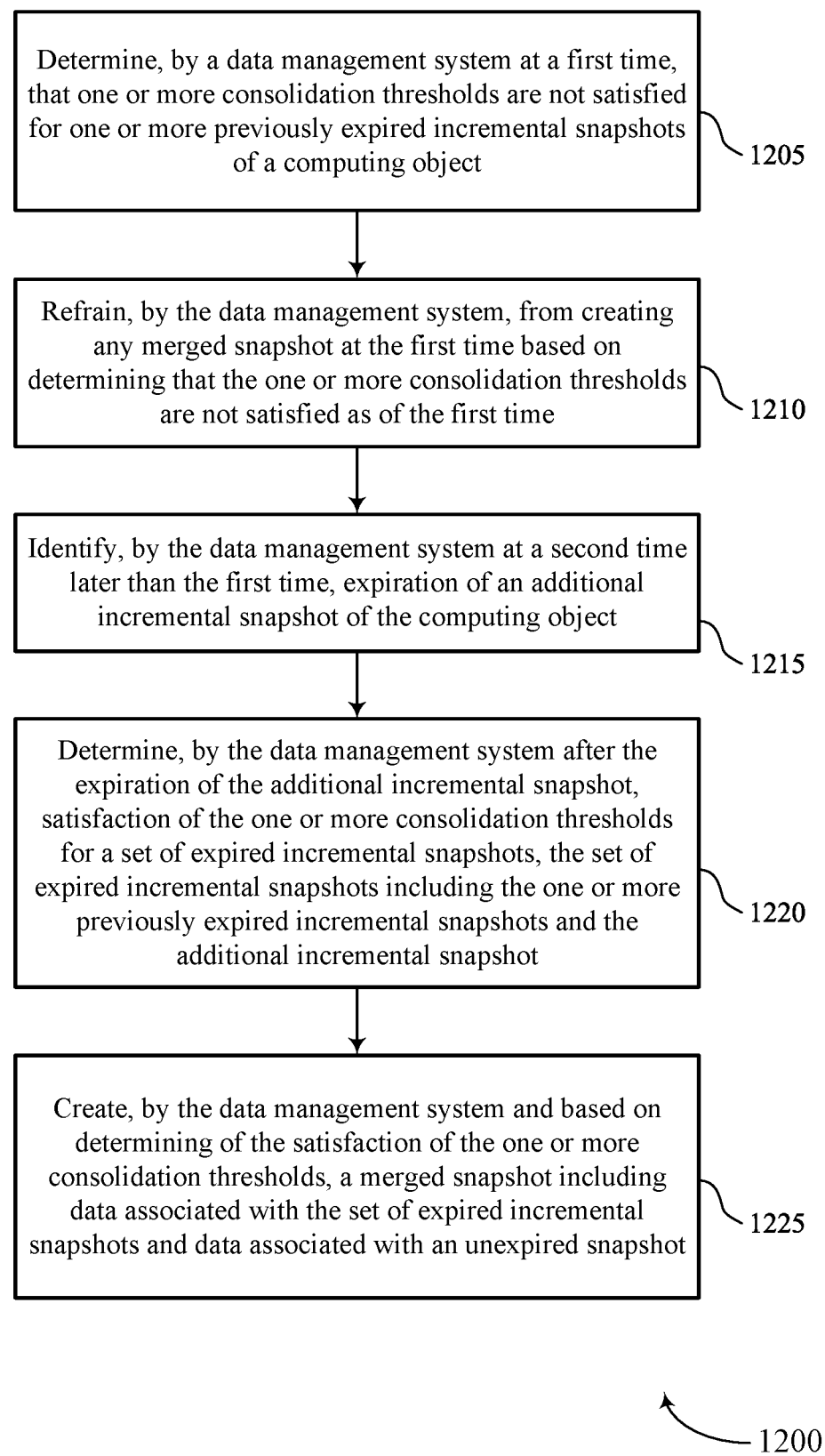

FIG. 12 shows a flowchart illustrating a method 1200 that supports batch consolidation of computing object snapshots in accordance with aspects of the present disclosure. The operations of the method 1200 may be implemented by a DMS or its components as described herein. For example, the operations of the method 1200 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1205, the method may include determining, by a DMS at a first time, that one or more consolidation thresholds are not satisfied for one or more previously expired incremental snapshots of a computing object. The operations of block 1205 may be performed in accordance with examples as disclosed herein. In some examples, aspects of the operations of 1205 may be performed by a consolidation threshold manager 830 as described with reference to FIG. 8.

At 1210, the method may include refraining, by the DMS, from creating any merged snapshot at the first time based on determining that the one or more consolidation thresholds are not satisfied as of the first time. The operations of block 1210 may be performed in accordance with examples as disclosed herein. In some examples, aspects of the operations of 1210 may be performed by a snapshot consolidation manager 835 as described with reference to FIG. 8.

At 1215, the method may include identifying, by the DMS at a second time later than the first time, expiration of an additional incremental snapshot of the computing object. The operations of block 1215 may be performed in accordance with examples as disclosed herein. In some examples, aspects of the operations of 1215 may be performed by a snapshot expiration manager 825 as described with reference to FIG. 8.

At 1220, the method may include determining, by the DMS after the expiration of the additional incremental snapshot, satisfaction of the one or more consolidation thresholds for a set of expired incremental snapshots, the set of expired incremental snapshots including the one or more previously expired incremental snapshots and the additional incremental snapshot. The operations of block 1220 may be performed in accordance with examples as disclosed herein. In some examples, aspects of the operations of 1220 may be performed by a consolidation threshold manager 830 as described with reference to FIG. 8.

At 1225, the method may include creating, by the DMS and based on determining of the satisfaction of the one or more consolidation thresholds, a merged snapshot including data associated with the set of expired incremental snapshots and data associated with an unexpired snapshot. The operations of block 1225 may be performed in accordance with examples as disclosed herein. In some examples, aspects of the operations of 1225 may be performed by a snapshot consolidation manager 835 as described with reference to FIG. 8.

A method by an apparatus is described. The method may include identifying, by a DMS, an expiration of a first incremental snapshot of a computing object, the first incremental snapshot being one of a set of multiple snapshots of the computing object accessible to the DMS, determining, by the DMS after the expiration of the first incremental snapshot, satisfaction of one or more consolidation thresholds for a set of expired incremental snapshots included in the set of multiple snapshots, the set of expired incremental snapshots including the first incremental snapshot, and creating, by the DMS and based on determining of the satisfaction of the one or more consolidation thresholds, a merged snapshot including data associated with the set of expired incremental snapshots and data associated with an unexpired snapshot included in the set of multiple snapshots.

An apparatus is described. The apparatus may include one or more memories storing processor executable code, and one or more processors coupled with the one or more memories. The one or more processors may individually or collectively operable to execute the code to cause the apparatus to identify, by a DMS, an expiration of a first incremental snapshot of a computing object, the first incremental snapshot being one of a set of multiple snapshots of the computing object accessible to the DMS, determine, by the DMS after the expiration of the first incremental snapshot, satisfaction of one or more consolidation thresholds for a set of expired incremental snapshots included in the set of multiple snapshots, the set of expired incremental snapshots including the first incremental snapshot, and create, by the DMS and based on determining of the satisfaction of the one or more consolidation thresholds, a merged snapshot including data associated with the set of expired incremental snapshots and data associated with an unexpired snapshot included in the set of multiple snapshots.

Another apparatus is described. The apparatus may include means for identifying, by a DMS, an expiration of a first incremental snapshot of a computing object, the first incremental snapshot being one of a set of multiple snapshots of the computing object accessible to the DMS, means for determining, by the DMS after the expiration of the first incremental snapshot, satisfaction of one or more consolidation thresholds for a set of expired incremental snapshots included in the set of multiple snapshots, the set of expired incremental snapshots including the first incremental snapshot, and means for creating, by the DMS and based on determining of the satisfaction of the one or more consolidation thresholds, a merged snapshot including data associated with the set of expired incremental snapshots and data associated with an unexpired snapshot included in the set of multiple snapshots.

A non-transitory computer-readable medium storing code is described. The code may include instructions executable by a processor to identify, by a DMS, an expiration of a first incremental snapshot of a computing object, the first incremental snapshot being one of a set of multiple snapshots of the computing object accessible to the DMS, determine, by the DMS after the expiration of the first incremental snapshot, satisfaction of one or more consolidation thresholds for a set of expired incremental snapshots included in the set of multiple snapshots, the set of expired incremental snapshots including the first incremental snapshot, and create, by the DMS and based on determining of the satisfaction of the one or more consolidation thresholds, a merged snapshot including data associated with the set of expired incremental snapshots and data associated with an unexpired snapshot included in the set of multiple snapshots.

In some examples of the method, apparatus, and non-transitory computer-readable medium described herein, creating the merged snapshot may include operations, features, means, or instructions for selecting most recent versions of data blocks from among the set of expired incremental snapshots and the unexpired snapshot for inclusion in the merged snapshot.

In some examples of the method, apparatus, and non-transitory computer-readable medium described herein, determining the satisfaction of the one or more consolidation thresholds may include operations, features, means, or instructions for determining that a quantity of expired incremental snapshots of the set of expired incremental snapshots exceeds a threshold quantity, the one or more consolidation thresholds including the threshold quantity.

In some examples of the method, apparatus, and non-transitory computer-readable medium described herein, determining the satisfaction of the one or more consolidation thresholds may include operations, features, means, or instructions for determining that a duration until expiration of a next incremental snapshot of the set of multiple snapshots may be greater than a threshold duration, the one or more consolidation thresholds including the threshold duration.

In some examples of the method, apparatus, and non-transitory computer-readable medium described herein, determining the satisfaction of the one or more consolidation thresholds may include operations, features, means, or instructions for determining that a time period since expiration of a temporally earliest incremental snapshot of the set of expired incremental snapshots exceeds a threshold time period, the one or more consolidation thresholds including the threshold time period.

In some examples of the method, apparatus, and non-transitory computer-readable medium described herein, determining the satisfaction of the one or more consolidation thresholds may include operations, features, means, or instructions for determining that an amount of available storage space within a storage system at which the set of multiple snapshots may be stored may be less than a threshold amount of storage space, the one or more consolidation thresholds including the threshold amount of storage space.

In some examples of the method, apparatus, and non-transitory computer-readable medium described herein, determining the satisfaction of the one or more consolidation thresholds may include operations, features, means, or instructions for determining that a collective data size of the set of expired incremental snapshots exceeds a threshold data size, the one or more consolidation thresholds including the threshold data size.

Some examples of the method, apparatus, and non-transitory computer-readable medium described herein may further include operations, features, means, or instructions for determining, by the DMS at a first time prior to the expiration of the first incremental snapshot of the computing object, that the one or more consolidation thresholds for the set of expired incremental snapshots are not satisfied for one or more previously expired incremental snapshots, the set of expired incremental snapshots comprising the one or more previously expired incremental snapshots and the first incremental snapshot, and refraining, by the DMS, from creating any merged snapshot at the first time based on determining that the one or more consolidation thresholds may be not satisfied as of the first time.

Some examples of the method, apparatus, and non-transitory computer-readable medium described herein may further include operations, features, means, or instructions for determining, by the DMS and based on a clock of a storage system at which the set of multiple snapshots may be stored, that a time period for a periodic consolidation operation may be satisfied, where determining the satisfaction of the one or more consolidation thresholds may be responsive to determining that the time period for the periodic consolidation operation may be satisfied.

Some examples of the method, apparatus, and non-transitory computer-readable medium described herein may further include operations, features, means, or instructions for determining the satisfaction of the one or more consolidation thresholds may be responsive to identifying the expiration of the first incremental snapshot.

Some examples of the method, apparatus, and non-transitory computer-readable medium described herein may further include operations, features, means, or instructions for receiving, by the DMS, scheduling information for expiration of the set of multiple snapshots, where identifying the expiration of the first incremental snapshot may be based on the scheduling information.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   identifying, by a data management system, an expiration of a first incremental snapshot of a computing object, the first incremental snapshot being one of a plurality of snapshots of the computing object accessible to the data management system;
   determining, by the data management system after the expiration of the first incremental snapshot, satisfaction of one or more consolidation thresholds for a set of expired incremental snapshots included in the plurality of snapshots, the set of expired incremental snapshots including the first incremental snapshot; and
   creating, by the data management system and based at least in part on determining of the satisfaction of the one or more consolidation thresholds, a merged incremental snapshot comprising data associated with the set of expired incremental snapshots and data associated with an unexpired incremental snapshot included in the plurality of snapshots.

2. The method of claim 1, wherein creating the merged incremental snapshot comprises:
   selecting most recent versions of data blocks from among the set of expired incremental snapshots and the unexpired incremental snapshot for inclusion in the merged incremental snapshot.

3. The method of claim 1, wherein determining the satisfaction of the one or more consolidation thresholds comprises:
   determining that a quantity of expired incremental snapshots of the set of expired incremental snapshots exceeds a threshold quantity, the one or more consolidation thresholds comprising the threshold quantity.

4. The method of claim 1, wherein determining the satisfaction of the one or more consolidation thresholds comprises:
   determining that a duration until expiration of a next incremental snapshot of the plurality of snapshots is greater than a threshold duration, the one or more consolidation thresholds comprising the threshold duration.

5. The method of claim 1, wherein determining the satisfaction of the one or more consolidation thresholds comprises:

determining that a time period since expiration of a temporally earliest incremental snapshot of the set of expired incremental snapshots exceeds a threshold time period, the one or more consolidation thresholds comprising the threshold time period.

6. The method of claim 1, wherein determining the satisfaction of the one or more consolidation thresholds comprises:
determining that an amount of available storage space within a storage system at which the plurality of snapshots are stored is less than a threshold amount of storage space, the one or more consolidation thresholds comprising the threshold amount of storage space.

7. The method of claim 1, wherein determining the satisfaction of the one or more consolidation thresholds comprises:
determining that a collective data size of the set of expired incremental snapshots exceeds a threshold data size, the one or more consolidation thresholds comprising the threshold data size.

8. The method of claim 1, further comprising:
determining, by the data management system at a first time prior to the expiration of the first incremental snapshot of the computing object, that the one or more consolidation thresholds are not satisfied for one or more previously expired incremental snapshots, the set of expired incremental snapshots comprising the one or more previously expired incremental snapshots and the first incremental snapshot; and
refraining, by the data management system, from creating any merged incremental snapshot at the first time based at least in part on determining that the one or more consolidation thresholds are not satisfied as of the first time.

9. The method of claim 1, further comprising:
determining, by the data management system and based at least in part on a clock of a storage system at which the plurality of snapshots are stored, that a time period for a periodic consolidation operation is satisfied, wherein determining the satisfaction of the one or more consolidation thresholds is responsive to determining that the time period for the periodic consolidation operation is satisfied.

10. The method of claim 1, wherein determining the satisfaction of the one or more consolidation thresholds is responsive to identifying the expiration of the first incremental snapshot.

11. The method of claim 1, further comprising:
receiving, by the data management system, scheduling information for expiration of the plurality of snapshots, wherein identifying the expiration of the first incremental snapshot is based at least in part on the scheduling information.

12. An apparatus, comprising:
one or more memories storing processor-executable code; and
one or more processors coupled with the one or more memories and individually or collectively operable to execute the code to cause the apparatus to:
identify, by a data management system, an expiration of a first incremental snapshot of a computing object, the first incremental snapshot being one of a plurality of snapshots of the computing object accessible to the data management system;
determine, by the data management system after the expiration of the first incremental snapshot, satisfaction of one or more consolidation thresholds for a set of expired incremental snapshots included in the plurality of snapshots, the set of expired incremental snapshots including the first incremental snapshot; and
create, by the data management system and based at least in part on determining of the satisfaction of the one or more consolidation thresholds, a merged incremental snapshot comprising data associated with the set of expired incremental snapshots and data associated with an unexpired incremental snapshot included in the plurality of snapshots.

13. The apparatus of claim 12, wherein, to create the merged incremental snapshot, the one or more processors are individually or collectively operable to execute the code to cause the apparatus to:
select most recent versions of data blocks from among the set of expired incremental snapshots and the unexpired incremental snapshot for inclusion in the merged incremental snapshot.

14. The apparatus of claim 12, wherein, to determine the satisfaction of the one or more consolidation thresholds, the one or more processors are individually or collectively operable to execute the code to cause the apparatus to:
determine that a quantity of expired incremental snapshots of the set of expired incremental snapshots exceeds a threshold quantity, the one or more consolidation thresholds comprising the threshold quantity.

15. The apparatus of claim 12, wherein, to determine the satisfaction of the one or more consolidation thresholds, the one or more processors are individually or collectively operable to execute the code to cause the apparatus to:
determine that a duration until expiration of a next incremental snapshot of the plurality of snapshots is greater than a threshold duration, the one or more consolidation thresholds comprising the threshold duration.

16. The apparatus of claim 12, wherein, to determine the satisfaction of the one or more consolidation thresholds, the one or more processors are individually or collectively operable to execute the code to cause the apparatus to:
determine that a time period since expiration of a temporally earliest incremental snapshot of the set of expired incremental snapshots exceeds a threshold time period, the one or more consolidation thresholds comprising the threshold time period.

17. The apparatus of claim 12, wherein, to determine the satisfaction of the one or more consolidation thresholds, the one or more processors are individually or collectively operable to execute the code to cause the apparatus to:
determine that an amount of available storage space within a storage system at which the plurality of snapshots are stored is less than a threshold amount of storage space, the one or more consolidation thresholds comprising the threshold amount of storage space.

18. The apparatus of claim 12, wherein, to determine the satisfaction of the one or more consolidation thresholds, the one or more processors are individually or collectively operable to execute the code to cause the apparatus to:
determine that a collective data size of the set of expired incremental snapshots exceeds a threshold data size, the one or more consolidation thresholds comprising the threshold data size.

19. The apparatus of claim 12, wherein the one or more processors are individually or collectively further operable to execute the code to cause the apparatus to:
determine, by the data management system at a first time prior to the expiration of the first incremental snapshot of the computing object, that the one or more consolidation thresholds are not satisfied for one or more previously expired incremental snapshots, the set of expired incremental snapshots comprising the one or more previously expired incremental snapshots and the first incremental snapshot; and refrain, by the data management system, from creating any merged incremental snapshot at the first time based at least in part on determining that the one or more consolidation thresholds are not satisfied as of the first time.

20. A non-transitory computer-readable medium storing code, the code comprising instructions executable by one or more processors to:

identify, by a data management system, an expiration of a first incremental snapshot of a computing object, the first incremental snapshot being one of a plurality of snapshots of the computing object accessible to the data management system;

determine, by the data management system after the expiration of the first incremental snapshot, satisfaction of one or more consolidation thresholds for a set of expired incremental snapshots included in the plurality of snapshots, the set of expired incremental snapshots including the first incremental snapshot; and create, by the data management system and based at least in part on determining of the satisfaction of the one or more consolidation thresholds, a merged incremental snapshot comprising data associated with the set of expired incremental snapshots and data associated with an unexpired incremental snapshot included in the plurality of snapshots.

\* \* \* \* \*